(12) United States Patent
McBride et al.

(10) Patent No.: US 7,769,877 B2
(45) Date of Patent: Aug. 3, 2010

(54) MOBILE GATEWAY DEVICE

(75) Inventors: Brian McBride, Carp (CA); Laura Mihaela Serghi, Ottawa (CA); Lyle Strub, Ottawa (CA)

(73) Assignee: Alcatel Lucent, Paris (FR)

( * ) Notice: Subject to any disclaimer, the term of this patent is extended or adjusted under 35 U.S.C. 154(b) by 1133 days.

(21) Appl. No.: 11/411,780

(22) Filed: Apr. 27, 2006

(65) Prior Publication Data

US 2007/0255852 A1    Nov. 1, 2007

(51) Int. Cl.
*G06F 15/16*    (2006.01)
(52) U.S. Cl. .................. 709/230; 709/232; 709/238; 709/242; 709/245; 709/246
(58) Field of Classification Search ................ 709/230, 709/232, 238, 242, 245, 246
See application file for complete search history.

(56) References Cited

U.S. PATENT DOCUMENTS

| | | | |
|---|---|---|---|
| 2003/0105864 A1* | 6/2003 | Mulligan et al. ............. | 709/225 |
| 2005/0071423 A1* | 3/2005 | Rajaniemi .................... | 709/203 |
| 2005/0117595 A1* | 6/2005 | El-Beik et al. .............. | 370/401 |
| 2005/0193135 A1 | 9/2005 | Owen et al. | |
| 2005/0249194 A1* | 11/2005 | Sahaya et al. ............... | 370/352 |
| 2006/0111087 A1* | 5/2006 | Leitgeb et al. ........... | 455/414.1 |
| 2006/0111113 A1* | 5/2006 | Waris ......................... | 455/441 |
| 2006/0136990 A1* | 6/2006 | Hinton et al. .................. | 726/2 |
| 2006/0212836 A1* | 9/2006 | Khushraj et al. ............ | 715/866 |
| 2008/0040510 A1* | 2/2008 | Warner et al. ............... | 709/246 |

FOREIGN PATENT DOCUMENTS

| | | |
|---|---|---|
| WO | WO 02/096057 A | 11/2002 |
| WO | WO 03/091895 A | 11/2003 |
| WO | WO 2004/036334 A | 4/2004 |

OTHER PUBLICATIONS

Wonsuk Lee et al: "Intermediary based architecture for mobile web services", 8th Internationalconference on Advancedcommunication Technology (Feb. 2006) [online].

Alexander Keller et al: "The WSLA Framework: Specifying and Monitoring Service Level Agreements for Web Services", Journal of Network and Systems Management, Kluwer Academic Publishers-Plenumpublishers, NE., vol. 11, No. 1, Mar. 1, 2003 (pp. 57-81).

Caicedo Rendón et al: "Architectures for Web Services Access from Mobile Devices", Proceedingsof the Third Latin American Web Congress (LA-WEB '05), Buenos Aires, Argentina; (Oct. 2005), Piscataway,NJ, USA, IEEE pp. 93-97.

(Continued)

*Primary Examiner*—Djenane M Bayard
(74) *Attorney, Agent, or Firm*—Kramer & Amado P.C.

(57) ABSTRACT

The WS-Mobile Gateway is the interworking gateway between users of a mobile network and a WS extranet. The mobile gateway comprises a mobile end-user interface on the side of the mobile network, for user authentication and for separating the web services (WS) traffic from the non-WS traffic. A logic unit performs protocol conversion, address resolution, policy enforcement/definition and publishing operations on the WS traffic. An extranet interface processor routes the WS packets carrying control messages between the gateway and a WS controller which maintains the services registry, while the WS packets carrying data are routed between the mobile gateway and the WS provider.

18 Claims, 2 Drawing Sheets

OTHER PUBLICATIONS

Tosic V. et al: "On Requirements for Management of Mobile XML Web Services and a Corresponding Management System", Telecommunicationsin Modern Satellite, Cable and Broadcastingservices,2005., 7th Internationalconference on Nis. Serbia and Montenegro Sep. 28-30, 2005, Piscataway,NJ, USA IEEE Sep. 2005 (pp. 57-60).

Tosic V. et al: "A Management Infrastructure for Mobile/Embedded XML Web Services", Network Operationsand Management Symposium, 2006. NOMS 2006. 10th IEEE/IFIP, Vancouver, BC, Canada (Apr. 2006), Piscataway NJ. USA, IEEE (pp. 1-4).

Rosenberg J. et al: "SIP for Presence" (internet citation [online], Nov. 13, 1998: URL:http://www.alternic.org/drafts/drafts-r-s/draft-rosenberg-sip-pip-00.txt>.

* cited by examiner

MOBILE GATEWAY DEVICE

RELATED US PATENT APPLICATIONS

U.S. patent application Ser. No. 11/105,732 filed on Apr. 14, 2005, entitled "Network Services Infrastructure Systems and Methods" (McBride et al.);

U.S. patent application Ser. No. 11/105,601 filed on Apr. 14, 2005, entitled "Public and Private Network Service Management Systems and Methods" (Bou-Diab et al.);

U.S. patent application Ser. No. 11/105,821 filed on Apr. 14, 2005, entitled "Systems and Methods For Managing Network Services Between Private Networks" (Serghi et al.).

FIELD OF THE INVENTION

This invention relates generally to network services and, in particular, to a mobile gateway for management of web services.

BACKGROUND OF THE INVENTION

Services for which information is distributed within a communication network are generally referred to as network services. Examples of applications that may be referred to as network services include reservation systems, online shopping or auction sites, games, multimedia applications, calendars, maps, chat applications, weather displays, clocks, interactive design applications, stock tickers, currency converters and data entry/display systems. With the pervasive use of Web browsers and Web document formats across a range of platforms and devices, many developers employ the Web as an application environment. Web Services (WS) are an example of network services, i.e. they are a new type of Web applications that are self-contained, self-describing and modular, representing the next generation of web-based technology. This being a new technology, a brief review of the web services (WS) follows for reader's convenience, and for better explaining the present invention.

Web services can be viewed as a sophisticated standard-based machine to machine Remote Procedure Call (RPC) technology for interconnecting multiple heterogeneous web-based applications, adapted to automatically exchange information over the public Internet network. This automation is bringing technology based processes and business efficiencies from technology companies to world leading non-technology companies, such as e.g. retail companies.

Web services are becoming the basis for electronic commerce of all forms; enterprises invoke the services of other enterprises to accomplish a business transaction. An example of a web service is automated supply chain management, where store front purchases are cleared by monetary agents, restocking orders are sent directly to the factories by the purchasing department, and billing information is collected by head offices, each with their own software systems.

In an environment in which only a few companies participate in business to business (B2B) or client-to-business (C2B) transactions, managing the discovery of business partners manually would be simple; however, this becomes a complex task as the number of companies that need to interact grows, along with the number and types of interfaces they export. Universal Description, Discovery, and Integration (UDDI) Project provides a standardized method for publishing and discovering information about web services. UDDI is a single conceptual registry hosted by different businesses on the Internet and distributed among many nodes that replicate the participating businesses' data with one another.

Conceptually, a business can register three types of information into a UDDI registry. Namely the White pages provide basic contact information and identifiers about a company, including business name, address, contact information, and unique identifiers. The information in the Yellow pages describes a web service using different categorizations (manufacturing or car sales business), so as to allow allows others to identify a particular web service based upon its categorization. Green pages provide technical information that describes the behaviors and supported functions of a web service hosted by your business. This information includes pointers to the grouping information of web services and where the web services are located.

Web services applications are built with pieces of code and data that may come from anywhere in the public Internet. The framework for enabling web services may be divided into three areas, including communication protocols, service description, and service discovery. A web service has an interface described in a machine-processable format, specifically WS description language WSDL, which is an XML (eXtensible Markup Language)-based language and represents a standardized approach to network service description. Any mode of transport can be used for communication, although Internet standards such as HyperText Transfer Protocol (HTPP) are currently the most popular.

The extensible Markup Language (XML) is a meta language that allows the definition of new vocabularies for document or data exchange, being specified by the World Wide Web Consortium (W3C). The W3C is an international industry consortium created to lead the Web to its full potential by developing common protocols, addressing the needs for an extensible and interoperable Web. The W3C is the primary center for developing other cross-industry specifications that are based on XML.

Some of these are being done within the XML Activity group, which tries to keep a balance between maintaining stability and backwards compatibilities, making improvements that help to encourage interoperability, and bringing new communities into the world of XML. Simple Object Access Protocol (SOAP) is a new way for enabling programs to communicate with each-other for exchanging structured information in a decentralized, distributed environment, created with the view to make it much easier for programmers to write applications. It defines a SOAP header and a SOAP payload, where the header indicates the type of payload (request message, reply message, fault, etc.). SOAP uses XML to encapsulate the data that needs to be sent to a remote subroutine of an application, providing a message construct that can be exchanged over a variety of underlying protocols. XML is used to return data from the remote subroutine and to return notification of any error condition that might have occurred.

Currently, only parts of the Web are accessible from cellular phones, TV, digital cameras, and in-car computers. Mobile Web access suffers from interoperability and usability problems that make the Web difficult to use for most mobile phone subscribers. W3C's Mobile Web Initiative (W3C MWI), launched in May 2005, proposes to address these issues through a concerted effort of key players in the mobile production chain, including authoring tool vendors, content providers, handset manufacturers, browser vendors and mobile operators. Currently, the W3C MWI is focusing on developing best practices for "mobileOK" Web sites, device information needed for content adaptation, and marketing and outreach activities.

In addition, there are a few problems with the existing Internet based service solutions available today, particularly in the area of wireless/mobile services. For example, the carriers avoid opening-up their mobile devices to the public infrastructure because of the difficulty of controlling the transactions, which result in lost revenue. A web services solution for mobile/wireless clients will provide a standards-based mechanism allowing controlled access, while enabling the carrier to bill for services as the intermediate broker.

Still further, it is difficult to put large clients on mobile phones able to inter-work over the Internet, in order to, for example, execute database queries; this requires tight coupled software clients with enterprise backend systems. A web browser interface is ineffective in this case, in particular when it needs to penetrate the public facing firewalls etc. to the backend servers.

There is a need to provide a solution to enable mobile and fixed wireless network clients to access the web services extranet, a solution that provides secure access to the extranet services, performs data transformation, supports proxies for various web services and XML standard and non-standard features.

SUMMARY OF THE INVENTION

It is an object of the invention to provide a mobile gateway as an interworking gateway between fixed and mobile wireless clients and a private extranet for management of web services for wireless users.

It is another object of the invention to provide a mobile gateway that supports proxies for web services and XML "standards" as well as new and currently non-standard features.

Accordingly, the invention provides a mobile gateway for enabling extension of web services offered over an extranet to mobile WS users connected to a mobile network, the extranet being overlaid on a data network, the mobile gateway comprising: a mobile end-user interface on the side of the mobile network, for user authentication and for separating the first type traffic comprised of web services (WS) packets from second type traffic comprised of non-WS packets; a logic unit for performing protocol conversion, address resolution, policy enforcement/definition and publishing operations on the first type traffic; and an extranet interface processor for distinctly routing the WS packets carrying control messages from WS packets carrying data between the extranet and the logic unit.

The invention also provides a method for enabling extension of web services offered over an extranet to mobile WS users connected to a mobile network, the mobile network being connected to the extranet over a mobile gateway, the extranet being overlaid on a data network, the method comprising: a) authenticating from the mobile gateway a mobile WS user that requests access to the extranet for employing a web service (WS) of interest; b) transmitting from the mobile WS user a request message for publication of web services of the same category with the WS of interest, offered by one or more providers of the WS of interest; c) engaging in negotiations with a WS provider of the remote WS, for obtaining agreement on a service level for the WS of interest, based on the description published for the WS of interest; and d) executing the WS of interest at the WS provider and confirming to the mobile WS user that the WS of interest has been executed successfully.

According to another aspect, the invention also presents a method for enabling extension of web services offered over an extranet to mobile WS users connected to a mobile network, the mobile network being connected to the extranet over a mobile gateway, the extranet being overlaid on a data network, the method comprising: e) authenticating from the mobile gateway a mobile WS provider that requests access to the extranet for advertising a local web service (WS); f) receiving at the mobile gateway a request message for publication of the local WS from a remote WS user; g) engaging in negotiations with the remote WS user for obtaining agreement on a service level for the local WS, based on the description of the local WS published by the mobile gateway on behalf of the mobile WS provider; and h) executing the local WS at the mobile WS provider and confirming to the remote WS user that the service has been executed successfully.

Advantageously, the mobile gateway of the invention provides wireless clients (users and wireless service providers) with direct access to service opportunities offered over a web services enabled extranet.

Another advantage of the mobile gateway according to the invention is that it enables wireless clients with the management and security requirements granted to non-wireless clients of the web services enabled extranet. In other words, the gateway provides secure access to private extranet services, proxies the web services registry, performs data transformation and enforces policies to control web service access on mobile clients.

BRIEF DESCRIPTION OF THE DRAWINGS

The foregoing and other objects, features and advantages of the invention will be apparent from the following more particular description of the preferred embodiments, as illustrated in the appended drawings, where.

DETAILED DESCRIPTION

Figure 1:
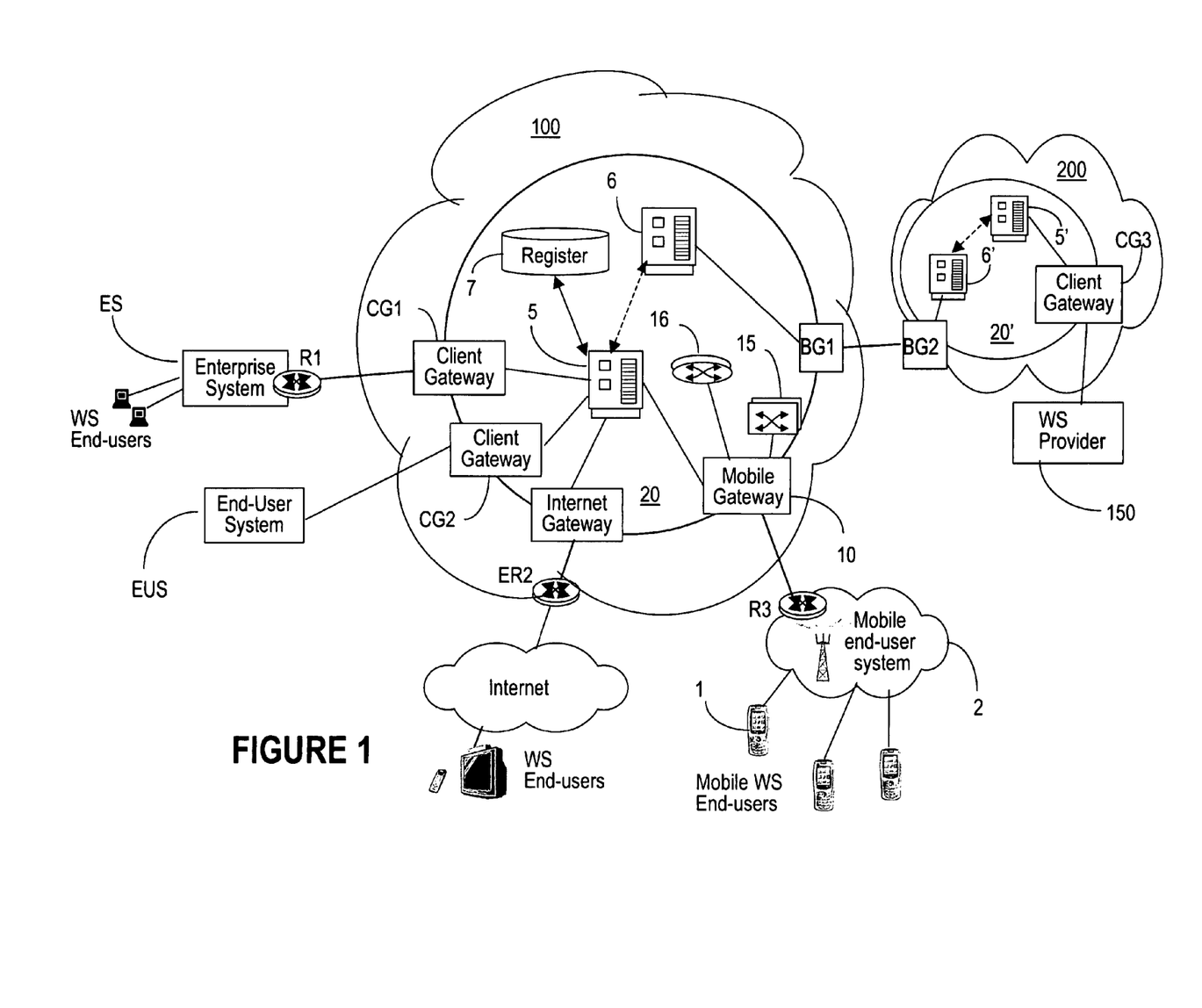
FIG. 1 illustrates a block diagram of a communication system equipped with a mobile gateway according to the invention.

FIG. 1 illustrates a block diagram of a communication system illustrating a plurality of options that the web services users have, also showing a mobile gateway according to the invention. The example of FIG. 1 is provided for describing the environment where the web services mobile gateway of the invention may be used. There are two communication networks shown in this example, a first network 100, and a second network 200, which may be administered by different network providers. A web services provider 150 administers and provides web services to the clients of these two networks; obviously, one WS provider per network is another possible scenario.

The web services are provided over logical networks 20 and 20', which are referred here using the term "extranet" or "services network"; the logical networks 20 and 20' are overlaid on the respective communication network 100, 200, and the extranets communicate using border gateways BG1 and BG1. Services network 20 enables network services provided by each or some of enterprise systems, end users systems EUS, or mobile end-users 1 to be made accessible to WS end-users in the other systems. The service network 20 uses existing standards and specifications, which have been developed for each of these areas.

An extranet, such as extranet 20, is equipped with a WS internal services controller (WS-ISC) 5. The role of WS-ISC in extranet 20 is to hold and manage the locally published extranet services including at least policies, security, registries and system management for end-to-end network services applications.

Here, the term "policies management" refers to updating and managing constraints (obligations and permissions) applicable to various applications used by the WS; some relate to accessing resources in particular ways, others relate more generally to the allowable actions that may be performed, and by which clients. Security management refers to message encryption (for confidentiality within the network), digital signatures (for sender authentication), other security certificates, etc. To this end, controller 5 hosts a central repository of all policies, service level agreements (SLAs), etc. along with network monitoring data. The term "registries management" refers to management and publishing of a WS registry 7 which stores lists with all web services available within the extranet; WS-ISC 5 enables clients to publish, or view, select and locate a WS of interest. WS-ISC 5 is equipped with a GUI server and a service portal; a GUI client (or a web client) is displayed on the client monitor. WS-ISC 5 is described in further details in the above-identified U.S. patent application Ser. No. 11/105,732.

In the configuration shown in FIG. 1, web services provider 150 offers WS to both clients of extranets 20 and 20'. To this end, each extranet includes a WS external services controller (WS-ESC) 6, 6' that communicate with each other over border gateways BG1 and BG2. The WS-ESCs also communicate with the respective WS-ISC, as shown on FIG. 1. The role of WS-ESC in extranet 20 is to host and manage the external discovered extranet services that exist in other enterprises like enterprise 20'. These external services are dynamically learned by the border gateway element BG1 and communicated to the local WS-ESC.

BG1 usually talks to other border elements from other administrative domains (like BG2 of extranet 20'). For example, BG1 and BG2 always do inter-domain exchange of new extranet services and their associated metadata (WSDL files, schema files, policies, service contracts, etc). During this exchange, BG1 is able to learn the services published in enterprise 20' while BG2 is able to learn the services of enterprise 20.

As shown in FIG. 1, an enterprise system ES participates in extranet 20 over a client gateway CG1, described in detail in the above-identified patent application Ser. No. 11/105,732. To summarize, a client gateway is in essence a secure network service proxy appliance for implementing a web service gateway function, supporting proxies for network services and XML "standards", as well as new features. The client gateways are high-performance devices implemented at least in part using hardware, and are configured for enabling deployment of web services by a services network provider.

Obviously, more than one enterprise system may be connected to the extranet 20, over a respective client gateway CG1. The enterprise system(s) ES may use WS applications offered by other users of the extranets 20 and 20'. In turn, ES may provide web services for other users of the extranets. The enterprise network ES may be of any type; what is relevant to the invention is that it offers and/or uses specific services inside and outside an enterprise environment. In a typical installation, an enterprise network will present a border router R1 communicating with the client gateway CG1, a firewall that controls the traffic entering the enterprise, a firewall that filters the web services traffic and also has other intranet traffic switching and routing equipment, one or more servers for supporting intranet network services, and personal computers, etc.

Also shown on FIG. 1 is an end user system EUS, illustrative of a private client system, which is not part of a specific enterprise system. Such an end-user system may gain access to network 100 at the edge router ER1 and then to the WS offered over services network 20 using a client gateway CG2, as shown, or may gain access to the extranet 20 using client gateway CG1.

A mobile end user, also referred to as "a" mobile WS user", may also access the web services offered over services network 20 using a web services (WS) mobile gateway 10 which is the object of this invention. An example of a mobile end user 1 is a portable computer system, a PDA, a mobile "smart phone", etc., which is a client of a wireless network 2; clients of network 2 access the WSs offered by extranet 20 and even 20' over a router R3 connected to the mobile gateway 10. Router R3 may perform wireless-to-landline conversion of the signals between the two networks; or, alternatively, the conversion may be performed at the mobile gateway 10.

With web services becoming the dominant mechanism for business-to-business (B2B) networked applications (such as purchase/manufacturing orders) and client to business (C2B) networked applications (for ex, C2B e-commerce operations where companies selling products or services to individuals), the mobile gateway 10 becomes a significant component of the web services extranet for large enterprises with mobile or remote employees. It also enables new service opportunities for kiosks, sensor networks and other non traditional uses of the wireless infrastructure. Its value is a result of the value of the extranet service itself. The WS mobile gateway of the invention endeavors to provide a solution to enable mobile and fixed wireless network clients to access a web services extranet.

FIG. 1 also shows generic network nodes (routers, switches) 16 that route/switch the traffic over network 100, and routers 15 that switch the SOAP calls over extranet 20. In order to advertise a web service that it provides, mobile end-user 1 sends to controller 5 a SOAP request indicating that it wishes to add the respective service to the WS's available on extranet 20; the information that it sends to the WS-ISC 5 includes the location of the service, a description of the service, associated policies and/or SLA's, billing information, etc, so that when the service is published, the users will have all information necessary to use the service.

When mobile user 1 wishes to consume services available on the extranet, it first requests to see the registry for finding and selecting the services of interest; once the service, service address and the associated registration, authorization, security and other policies are viewed and agreed upon, mobile user 1 may proceed with using the service. In this arrangement, mobile user 1 may execute remotely a complex application of interest, without having to upload and download data to/from the location of the application over communication network 100. This mode of operation is particularly advantageous for mobile devices that do not have huge processing capacity.

A virtual extranet service portal, which may be implemented as a software application in the mobile gateway 10, enables network service providers and mobile users in network 2 to interact with the services network 20. The portal allows users to log into the extranet 20 and authenticate themselves by means of a federated identity or another authentication scheme, and then provide or consume a selected service. Operations such as displaying various services lists, descriptions, etc., are also possible without substantially affecting how an end user provides and/or consumes network services.

Figure 2:
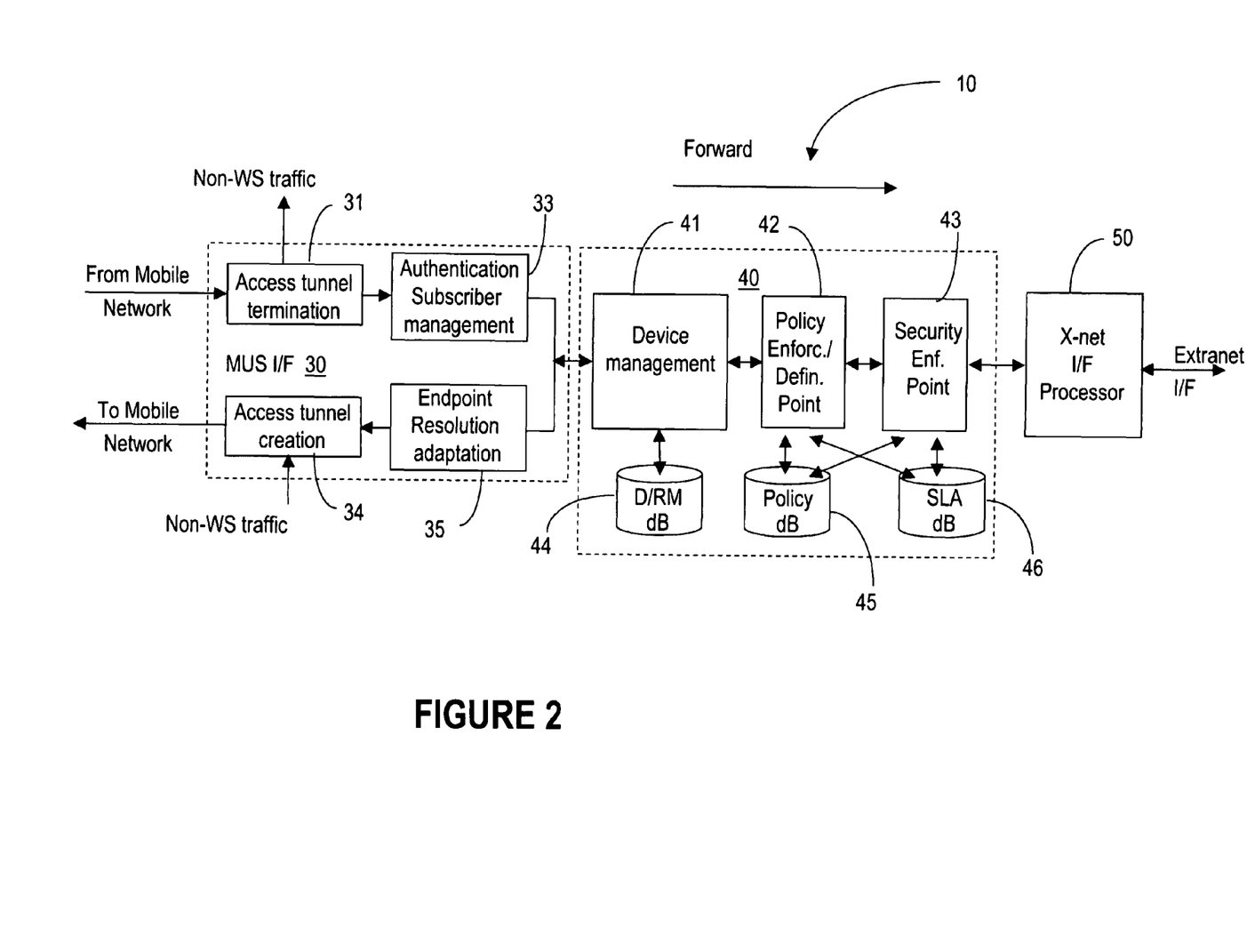
FIG. 2 shows a block diagram of an embodiment of the mobile gateway of the invention.

The WS mobile gateway 10 is a high-performance hardware-based edge device with embedded software for deployment by a network provider, as described next in connection with the block diagram of FIG. 2. FIG. 2 shows a block diagram of an embodiment of the mobile gateway of the invention. The terms "incoming" and "forward" are used for the direction from the mobile end-user network 2 to the service network 20, 20', while terms "outgoing" and "reverse" are used for the direction from the service network 20, 20' to the mobile end-user network 2. It is to be understood that these are relative terms used here for convenience. Terms "requestor" and "provider" are used for an entity requesting access to a particular service and providing a particular service, respectively, and the term "service of interest" is used for the WS application of interest to the requester.

Still further, the term "user" in this specification is used for designating a client of the extranet 20, which could be for example the mobile end-user network 2, or a mobile WS end-user as the user terminal 1 shown in FIG. 1 connected to mobile end-user network 2.

The WS mobile gateway 10 enables mobile WS end-users 1 to use the web services provided over extranet 20. Gateway 10 includes a mobile end-user network interface (MUN) 30 on the side of the mobile WS end-users 1, a WS/XML logic unit 40 and an extranet interface processor 50.

In the forward direction, the Mobile End-User Network (MUN) interface 30 terminates the incoming traffic as shown by the access tunnel termination unit 31. Access tunnel termination unit 31 filters the packets in the incoming traffic into packets of a first type, which includes the packets carrying WS traffic, and a second type which includes the packets carrying non-WS traffic. The terms "WS packets" and "non-WS packets" are used to designate these types of traffic. Access tunnel termination unit 31 sends the non-WS traffic to destination over routers 16 of data network 200 while the WS traffic is sent for authentication to block 33. It is also to be noted that the term "packet" has a generic meaning in this description, referring to any type of datagrams that carry the WS and the non-WS traffic.

The classification of these two packet types is made at the application layer. Access tunnel termination unit 31 is aware of the WS-based SOAP incoming traffic, by performing deep-packet inspection on all incoming traffic (up to the SOAP protocol level). Unit 31 performs address translation of the incoming packets from the public addresses (IP or other protocols) into a L7 address in the private space of the virtual extranet overlay 20, irrespective of the L2-L4 protocol used by the extranet 20. Unit 31 also may perform mobile/land protocol conversion operations; however, these operations may be performed in a distinct protocol converting unit.

Access tunnel termination unit 31 may be for example an XML-enabled GTP termination point that filters WS/XML requests and sends them to the WS/XML logic rather than data network; GTP is the standard that specifies interfaces for the General Packet Radio Service (GPRS) tunneling protocol. Equivalent wireless interfaces may equally be used.

Authentication subscriber management module 33 enforces the authentication part of the policies for user access to the extranet; only authenticated users can share the web services provided by others with the web services it may provide. Module 33 applies authentication actions based on the provider-specified rules and passes or drops the communication traffic responsive to the authentication actions. It requires a user ID and a password from the requester. In other words, subscriber authentication management module 33 does authentication with the extranet service provider rather than with a specific Web Service application as happens today in the enterprise. The WS mobile gateway 10 enables a single sign-on (SSO) to the extranet for service consumers to access multiple Web services across the network.

In the reverse direction, interface 30 includes an endpoint resolution adaptation unit 35 that tracks the mobile devices 1 served by mobile end-user network 2, and adapts the traffic to the changes in network 2 (e.g. bandwidth changes, etc.). An access tunnel creation unit 34 performs land/mobile protocol conversion operations, aggregates the non-WS traffic received over routers 16 of network 200 with the packets carrying XML, and sends the resulting traffic to the destination over mobile end-user network 2. In some network deployments unit 34 may be an XML-enabled GTP creation point.

Mobile gateway logic unit 40 includes a device management unit 41, a policy enforcement/definition point 42 and a security enforcement point 43, with associated databases: a device/resources management database 44, a policy database 45 and a service level agreement contracts database 46. The logic unit 40 performs conversion of the WS packets from whatever protocol the packets use for carrying the WS traffic to a layer L7 protocol. As indicated above, SOAP (Simple Object Access Protocol) is used currently to transport web services messages between a web client and a web server application. The logic unit 40 also performs conversion of the WS packets received over the extranet from the L7 protocol (ex. SOAP) to the protocol used by the mobile network 2.

Thus, in the forward direction, the device management unit 41 may create an XML envelope for the non-XML traffic; transformations are made from whatever format the messages have into XML-based Web Service messages. For the SOAP-based traffic, the message is examined for establishing the message class (request, reply) and provided to the policy enforcement point 42. Device management 41 also performs deep packet inspection, classifies and splits incoming data into control traffic to be forwarded to the WS-Services Controller 5 and XML data traffic to be forwarded towards destination WS's. In the reverse direction, if a transformation operation is requested, the XML envelope is terminated and the SOAP payload is recast into the format recognized by the consumer that requested the respective WS.

Device management 41 also publishes a web service interface on behalf of the client 1. The interface may provide additional information and other services such as location and presence information, message sending, intranet VoIP telephony, ringing indications etc. This will allow the enterprise systems to automate capabilities for paging remote executives as a result of new meeting requests or critical emails, remote maintenance crews for new work orders without using the public internet access to the mobile phone, remote salesmen to execute purchase orders etc. As far as clients in the mobile network 2 are concerned, all services advertised to the client by the extranet appear to be offered from the mobile gateway 10.

For the forward direction, the policy enforcement/definition point 42 is concerned with enforcing the applicable policies and SLA contracts to the incoming traffic. The policies enforceable at point 42 are WS-based and non-WS based policies (for requirements such as QoS, SLA, logging, monitoring, etc) and are stored in the policy database 45. For example, the policy point 42 identifies first if the incoming SOAP request is targeted at a Web service which is intended to be available to the requester. Then, it may identify if the content of the SOAP message is valid. This is analogous to what happens at the Network Layer, where IP packet headers are examined for validity.

As well, policy point 42 uses a collection of SLA (service level agreements) stored in SLA contract database 46 to apply these to the incoming traffic. The traffic that does not abide to the policies in the database 45 or to the SLA contracts in database 46, it is dropped at this point. In this way, the network is not occupied with the non-compliant traffic that is not dropped until reaching the destination in the current implementations.

A WS description language (WSDL) file is used for service description. This is a machine-processable specification which defines all the information necessary for a WS client to invoke the methods of a WS, such as individual methods names and signatures, data types, protocols and message formats allowed for each remote call in the extranet, the URL used to access that WS, etc. The WSDL file also specifies one or more network locations at which a provider can be invoked, and may provide some information about the message exchange pattern that is expected. In essence, the service description represents an agreement governing the mechanics of interacting with that service. As such, policy point 42 may also modify the messages as per the requirements in the WSDL or an existing extranet policy for accessing the particular service.

Security enforcement point 43 enforces compliance of traffic with security access standards, secure end to end communication between the authenticated user and the services network 20, within the services network, and between the services network and any other client of the services network. Thus, security enforcement point 43 may apply standards-based WS security techniques to the incoming traffic: WS-Security, XML-Encryption, and XML-Signature as well as other techniques that may be used to provide secure communications. These web services standards-based techniques ensure that authenticated service consumers in the enterprise systems and the mobile end-user network can participate in the virtual extranet services network 20. In some embodiments, additional security rules may also be applied to communication traffic. For the reverse direction, the security enforcement point 43 is involved in signature de-coding and message decryption.

In the reverse direction, the policy definition/enforcement point 42 is concerned with translating traffic according to the policies and SLA contracts applicable to the reverse traffic by mobile end-user network 2. In this case, the policies enforceable at point 42 are WS policies (with requirements at the WS level such as security, QoS, SLA, logging, monitoring, etc.) applicable to a mobile network 2. As well, policy point 42 uses the collection of SLA's stored in database 46 and applies to the reverse traffic the appropriate SLA for the mobile end-user 1. The traffic that does not abide to the policies in the database 45 or to the SLA's in database 46 is dropped at this point.

It is to be noted that the order for the policy enforcement/definition point 42 and security enforcement point 43 may be reversed. It also to be noted that both points 42 and 43 access the policy database 45 and SLA contract database 46 where the respective information needed for enforcing the policies and SLA contracts is stored. Obviously, databases 45 and 46 can be implemented as one database; they were represented distinctly to better describe the functionality of points 42 and 43.

Extranet interface processor 50 provides an interface with the services network 20 and routes appropriately incoming data control traffic towards the WS services controller 5 and XML data traffic to be forwarded towards the WS destination. In the reverse direction, all the received traffic is split into control traffic and data traffic based on the service address of the incoming messages. Control traffic messages from the WS-ISC are processed locally and terminated at the gateway. This control traffic is locally consumed by module 50, and may be for example used to update the local databases 44, 45, 46. Other control messages from the WS-ISC may be addressed to the mobile end user; these messages are only proxy-ed at the gateway. On the other hand, the incoming WS data traffic (SOAP request/replies between the WS provider and WS client) goes directly into the policy enforcement point 43.

To illustrate the operation of the mobile gateway, we will consider an example where a mobile WS end user 1 requests a service from an enterprise system ES (see FIG. 1).

a. The requestor must be first authenticated in order to gain access to WS offered by extranet 20; this is performed at the MUN interface 30.

b. The requester and provider entities need to become known to each other (or at least the requestor must know the provider), through a publish/discovery phase. Prior to exchanging SOAP traffic, the requestor must first discover if the service of interest is available, and identify the service in the extranet registry, so that the correct WS application is selected. To this end, the requestor must gain access to the web services registry 7, which is done by sending a request message from the user to the services controller 5. The control message is XML-encoded at the device management 41 and sent to services controller 5 after the policies were enforced by unit 42 and the message is transformed to extranet requirements in unit 43. As this is a control message, it is routed to controller 5 at the extranet interface 50.

c. The requester and provider entities agree on the service description and semantics that will govern the interaction between the requester and provider agents. UDDI (Universal Description, Discovery, and Integration) is currently used for publishing and discovering information about web services, for enabling enterprises and applications to quickly find web services over the Internet d. The service description and semantics are published by the requestor. WSDL (web services description language) represents an example of a standardized approach to service description. SOAP and WSDL provide standard-based capabilities and messaging facilities to bind and execute functionality anywhere, on any platform, without the need to write custom code.

e. The requestor and provider exchange messages, thus performing some task on behalf of the requester and provider entities. In this example, once the requestor requests a service, all providers offering services of the same category with the requested service are published on the requestor's GUI. Once the requestor selects a service offered by a provider, all information necessary for execution of the services is also published on the requestor's GUI. The exchange of messages with the provider agent represents the concrete manifestation of interacting with the provider entity's Web service. Once the service is executed at the provider's end, the requestor gets a reply message that confirms successful execution of the service.

A WS may be offered to the extranet from the mobile gateway, in which case the web service is locally implemented in the WS-XML logic unit 40.

a. WS-XML logic unit 40 publishes services (the local services) to the extranet registry 7, including the policies pertinent the respective services.

b. When mobile gateway 10 receives at the extranet interface 50 an incoming SOAP request for a specified local web service, the message is directed to the device management 41, where it is consumed.

c. A SOAP reply is generated by device 41 and sent out on the extranet interface 50 towards the end-client that has been remotely requesting and accessing the respective local service. For all incoming SOAP requests, at the mobile gateway, the policy enforcement gets executed on 42, and requests are dropped if not conforming to the initial web service publication.

We claim:

1. A mobile gateway for enabling extension of web services (WS) offered over an extranet to mobile WS users connected to a mobile network, said extranet being overlaid on a data network, said mobile gateway comprising:

a mobile WS end-user interface on the side of said mobile network, for user authentication and for separating the first type traffic comprised of web services packets from second type traffic comprised of non-WS packets, wherein the mobile end-user interface further comprises:

an authentication subscriber management unit that enables mobile WS users authenticated by an extranet service provider to consume a remote web service from any remote WS provider or to provide a local web service to any remote WS user over the extranet and enables a single sign-on(SSO) to the extranet to access multiple web services, an access tunnel termination unit that identifies the first type traffic translates the address of the WS packets from a public address into a L& address for the extranet, and routes the WS packets to the authentication subscriber management unit;

a logic unit for performing protocol conversion, address resolution, policy enforcement/definition and publishing operations on said first type traffic, wherein the logic unit further comprises:

a device management unit that convert protocols of the WS packets, classifies the WS packets into control packets carrying control messages and data packets carrying data, and publishes a service interface on behalf of the mobile WS user;

a policy enforcement/definition point that defines local policies pertinent to communication over the mobile network and WS policies pertinent to communication over the extranet and enforces the local and the WS policies, and a security enforcement point that enforces secure end to end communication over the extranet; and an extranet interface processor for distinctly routing the WS packets carrying control messages from WS packets carrying data between said extranet and said logic unit.

2. The mobile gateway of claim 1, wherein said access tunnel termination unit is an XML-enabled GTP termination point.

3. The mobile gateway of claim 1, wherein said mobile WS end-user interface further comprises:

an access tunnel creation unit for creating a tunnel between said mobile gateway and a mobile WS user and transmitting said first type traffic to said mobile WS user over said tunnel; and an endpoint resolution adaptation unit for tracking said mobile WS user in said mobile network and adapting the first type traffic destined to said mobile WS user to the current parameters of said tunnel.

4. The mobile gateway of claim 3, wherein said access tunnel creation unit also performs aggregation of second type traffic received from said data network with first type traffic received from said logic unit.

5. The mobile gateway of claim 3, wherein said access tunnel creation unit is an XML-enabled GTP termination point.

6. The mobile gateway of claim 5, wherein said service interface provides said mobile WS user with a list of all services advertised in said extranet.

7. The mobile gateway of claim 1, wherein said logic unit further comprises:

a SLA (Service Level Agreement) database with contracts applicable to a plurality of web services available over said extranet.

8. The mobile gateway of claim 1, wherein said logic unit further comprises:

A policy database with a plurality of policies enforceable on said extranet by an extranet service provider.

9. A method for enabling extension of web services (WS) offered over an extranet to mobile WS users connected to a mobile network, said mobile network being connected to said extranet over a mobile gateway, said extranet being overlaid on a data network, said method comprising:

authenticating with an extranet service provider from said mobile gateway a mobile WS user that requests access to said extranet for employing a web service of interest to enable a single sign-on (SSO) to the extranet to access multiple web services;

identifying the first type traffic;

translating the address of the WS packets from a public address into a L7 address for the extranet;

routing the WS packets to the authentication subscriber management unit;

transmitting from said mobile WS user a request message for discovery of web services of the same category with said WS of interest, offered by one or more providers of said WS of interest;

engaging in negotiations with a WS provider of said remote WS, for obtaining agreement on a service level for said WS of interest, based on the description published for said WS of interest;

converting protocols of the WS packets;

classifying the WS packets into control packets carrying control messages and data packets carrying data;

publishing a service interface on behalf of the mobile WS user;

defining local policies pertinent to communication over the mobile network and WS policies pertinent to communication over the extranet;

enforcing the local and the WS policies;

enforcing secure end to end communication over the extranet; and executing said WS of interest at said WS provider and confirming to said mobile WS user that said WS of interest has been executed successfully.

10. The method of claim 9, wherein the authenticating step further comprises:

filtering traffic received from said mobile network according to a traffic type, routing only a first type traffic including WS packets to said extranet, and routing non-WS packets to said data network;

translating the address of said WS packets from a public address used on said mobile network into a L7 address used on said extranet; and authenticating said mobile WS user in order to enable said mobile WS user to gain access to all or some WSs offered over said extranet.

11. The method of claim 10, wherein the authenticating step further comprises:

performing mobile to-land protocol conversion operations on said traffic.

12. The method of claim 9, wherein the transmitting step further comprises:
  generating said request message at said mobile WS user;
  routing said request message from said mobile gateway to an extranet controller for accessing a registry with said plurality of web services of the same category with the WS of interest;
  at said extranet controller, discovering said plurality of web services on a service interface, along with a service description and contact information for the respective remote WS providers;
  identifying from said mobile WS user a remote WS provider of interest based on said WS description.

13. The method of claim 12, wherein a Universal Description, Discovery, and Integration (UDDI) protocol is used for discovering and selecting said WS of interest.

14. The method of claim 12 wherein said service interface is proxied for said mobile WS user at said mobile gateway.

15. The method of claim 9, wherein service description and semantics of said plurality of web services use web services description a language (WSDL).

16. The method of claim 9, wherein the executing step further comprises:
  agreeing upon a service level and policies relating to execution of said WS of interest;
  routing data packets from said first type traffic between said mobile gateway and said remote WS provider by encapsulating said data packets using eXtensible Markup Language (XML);
  executing said WS of interest at said remote WS provider;
  upon successful execution of said WS of interest, transmitting to said mobile WS user over said extranet, said mobile gateway and said mobile network a confirmation of execution of said WS of interest, wherein use of XML within said extranet provides a packet construct that can be exchanged over a variety of underlying protocols within said mobile network.

17. The method of claim 16, wherein a Simple Object Access Protocol (SOAP) is used to exchange data packets between said WS provider and said mobile WS user.

18. A method for enabling extension of web services (WS) offered over an extranet to mobile WS users connected to a mobile network, said mobile network being connected to said extranet over a mobile gateway, said extranet being overlaid on a data network, said method comprising:
  authenticating with an extranet service provider from said mobile gateway a mobile WS provider that requests access to said extranet for advertising a local web service to enable a single sign-on (SSO) to the extranet to access multiple web services;
  identifying the first type traffic;
  translating the address of the WS packets from a public address into a L7 address for the extranet;
  routing the WS packets to the authentication subscriber management unit;
  receiving at said mobile gateway a request message for publication of said local WS from a remote WS user;
  engaging in negotiations with said remote WS user for obtaining agreement on a service level for said local WS, based on the description of said local WS published by said mobile gateway on behalf of said mobile WS provider;
  converting protocols of the WS packets;
  classifying the WS packets into control packets carrying control messages and data packets carrying data;
  publishing a service interface on behalf of the mobile WS user;
  defining local policies pertinent to communication over the mobile network and WS policies pertinent to communication over the extranet;
  enforcing the local and the WS policies;
  enforcing secure end to end communication over the extranet; and
  executing said local WS at said mobile WS provider and confirming to said remote WS user that said service has been executed successfully.

* * * * *

UNITED STATES PATENT AND TRADEMARK OFFICE
CERTIFICATE OF CORRECTION

PATENT NO.        : 7,769,877 B2                                    Page 1 of 1
APPLICATION NO.   : 11/411780
DATED             : August 3, 2010
INVENTOR(S)       : Brian McBride, Laura Mihaela Serghi and Lyle Strub It is certified that error appears in the above-identified patent and that said Letters Patent is hereby corrected as shown below:

Claim 1, column 11, line 15, after "mobile" please insert --WS-- column 11, line 26, please change "L&" to "L7"

column 11, line 33, please change "convert" to "converts"

Signed and Sealed this

Second Day of November, 2010

David J. Kappos
*Director of the United States Patent and Trademark Office*